Patented Aug. 5, 1952

2,606,174

UNITED STATES PATENT OFFICE 2,606,174

EMULSION POLYMERIZATION USING ULTRASONIC VIBRATIONS TO EFFECT EMULSIFICATION

Izaak M. Kolthoff and Charles W. Carr, Minneapolis, Minn., assignors to Phillips Petroleum Company, a corporation of Delaware No Drawing. Application August 25, 1947, Serial No. 770,552

4 Claims. (Cl. 260—83.7)

This invention relates to a novel method for effecting emulsion polymerization reactions. In a more specific aspect it relates to a method whereby the chief means of maintaining contact of the reactants in polymerization systems is provided through an initial production of stable emulsions and the necessity for continued vigorous mechanical agitation is substantially reduced or entirely eliminated. In a still more specific aspect the invention relates to the employment of ultrasonic waves as a means of producing stable emulsions in polymerization systems and thereby providing a means for effecting intimate contact of the reactants without the necessity of vigorous mechanical agitation.

When carrying out emulsion polymerization reactions one of the requisites is to maintain intimate contact between finely dispersed reactants and a dispersing medium during the polymerization period. In emulsion polymerization systems both oil and water phases are present and these phases must be dispersed, one in the other, before before polymerization will occur. Lack of contact of these two phases, with the consequent lack of contact of the reactants, results in very little if any polymerization. The degree of conversion is therefore controlled to a great extent as the effectiveness of contact of the reactants is increased. The method most generally employed in emulsion polymerization systems for maintaining dispersion of the oil and water phases, and thereby insuring contact of the reactants, is an agitating or stirring means. However, when this method is used, the emulsions produced are not stable and when stirring is slowed down or stopped, even momentarily, the oil and water phases immediately begin to separate and polymerization stops.

We have now found a method whereby dispersion of the reactants in emulsion polymerization systems is maintained through the production of stable emulsions and the necessity for continued vigorous mechanical agitation is substantially reduced or entirely eliminated. The method comprises exposing a mixture of the materials to be polymerized, together with the polymerization catalyst, modifier, emulsifying agent and an aqueous medium, to ultrasonic waves to effect production and stabilization of the emulsion, i. e., the intensity of the ultrasonic vibration and the duration of exposure thereto is sufficient only to transform said mixture into a stable emulsion, as is more thoroughly discussed hereinafter and illustrated in the examples. Upon exposure to ultrasonic waves emulsification begins at once and proceeds rapidly to completion and stabilization. The stable emulsion thus prepared is allowed to polymerize at the chosen temperature, say about 50° C., in the reactor until the desired degree of conversion has been attained. In general, the vigorous mechanical agitation ordinarily used in emulsion polymerization processes is not necessary when operating according to our method and only a mild form of stirring or other agitation of the reaction mixture is employed. At the end of the reaction period the latex is stabilized by the addition of an antioxidant, such as phenyl-beta-naphthylamine, after which the rubber is coagulated, and dried.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene) bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

A further object of this invention is to produce a synthetic rubber by polymerization of monomeric material in aqueous emulsion.

Another object of this invention is to polymerize a monomeric material in aqueous emulsion without continuous vigorous agitation of the reacting mixture.

Still another object of this invention is to simplify the production of synthetic rubber.

An additional object of this invention is to provide a novel method for polymerizing unsaturated organic materials.

Other objects and advantages of this invention will become apparent to one skilled in the art, from the accompanying disclosure and discussion.

Numerous variations may be introduced when using our ultrasonic treatment in emulsion polymerization processes. The reaction mixture may be subjected to repeated exposure to ultrasonic waves as often as desired during the course of the polymerization, or, in some cases, it may be preferred to use continuous ultrasonic treatment throughout the reaction period. However, since prolonged strong ultrasonic irradiation effects a pronounced heating of the irradiated material, removal of heat developed by prolonged irradiation may be necessary. The stable emulsion may be circulated through pipes during the conversion period or allowed to stand in vats or any desired type of reactor. One method of operation comprises passing the reaction mixture through a pipe where a means is provided for exposure to ultrasonic waves and the stable emulsion thus produced passed to a reactor where it is allowed to stand at the preferred temperature, or mildly agitated, for the length of time necessary to effect the desired conversion. Since the polymerization reaction is exothermic and generally proceeds best with removal of heat of reaction, sufficient stirring of the reacting emulsion to effect adequate contact with cooling equipment is often desired. If preferred, the emulsified reactants may be passed through a heat exchanger prior to entrance to the reactor, thus providing a method for temperature control. The use of a series of reactors and heat exchangers may sometimes be considered desirable, the polymerization mixture being subjected to ultrasonic treatment prior to passage through the first heat exchanger and into the first reactor.

As the heat from the polymerization reaction builds up, it is dissipated by passing the reactants through a second heat exchanger and thence into a second reactor. In this way as many reactors as desired may be employed and the polymerization temperature easily controlled. In some instances it may be found to be advantageous to use ultrasonic treatment as the mixture passes from one reactor to the other prior to entrance into the heat exchanger.

When operating according to the method of this invention temperatures may range from about —30 to about 70° C. with temperatures from about —10 to about 50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

In general, ultrasonic waves may be employed as a means of stabilizing emulsions in any emulsion polymerization system. For example, the method is applicable in systems wherein various comonomers, emulsifying agents, modifiers, activators, and the like are employed. By exposure of a polymerization mixture to ultrasonic waves, stable emulsions are produced in exceedingly brief intervals of time, for example, in one minute or less, while a similar mixture which has not been subjected to ultrasonic treatment must be agitated for a period of several hours in order to produce a stable emulsion. Ultrasonic vibrations from about 20 to about 500 kilocycles per second are generally satisfactory. When nonirridated and irridated standard polymerization mixtures were normally agitated at 50° C., the rate of polymer formation in both was found to be the same, even though the particle size of dispersed monomeric material was smaller in the irradiated sample. From this, it is concluded that the amount of interface between the dispersed particles and the aqueous phase is not the determining factor in regard to the rate of formation of polymer. As brought out hereinafter in Example IV, no stable emulsion upon irradiation at 200 kilocycles was obtained with a standard polymerization mixture when the soap concentration was only 0.3 parts per 100 parts of monomeric material. Although a stable emulsion was formed under the same conditions with 0.7 parts of soap, no polymerization resulted. From the results of Example IV it is concluded that, when using our invention, it is necessary not only to have some soap present to have a stable emulsion formed but also there should be sufficient soap present to have polymerization take place subsequent to formation of an emulsion by ultrasonic irradiation. The specific figures of Example IV are, of course, critical only for those specific reactants and the specific ratio of monomeric material to aqueous medium.

The ultrasonic waves for use in this invention may be produced by a vibrating quartz crystal. The crystal is placed on a lead electrode and covered with a brass electrode, and the whole system is immersed in a bath of transformer oil. Upon applying an alternating field of about 50,000 volts, the quartz is set in vibration. Any other method for the production of ultrasonic waves may be employed if desired.

Advantages of this invention are illustrated by the following examples. The reactants, and their proportions, and the other specific ingredients of the recipes are presented as being typical and should not be construed to limit the invention unduly.

EXAMPLE I

A polymerization mixture was prepared using the following recipe:

| | Parts by weight |
|---|---|
| Butadiene | 75 |
| Styrene | 25 |
| Potassium persulfate | 0.3 |
| Soap | 5.0 |
| Water | 180 |
| Primary dodecyl mercaptan | 0.5 |

A portion of this mixture was placed in each of two 20 mm. Pyrex tubes. One tube was subjected to ultrasonic waves having a frequency of about 200,000 cycles per second for two one-minute periods, during which time the entire mixture became a stable emulsion. The second tube was used as a control. Both tubes were then immersed in a water bath where the temperature was maintained at about 50° C. for four hours. At the end of this period the latex was coagulated with alcohol, washed, and dried. The percentage conversion in the sample subjected to ultrasonic treatment was 23 per cent while no reaction occurred in the control tube.

EXAMPLE II

Two polymerization reactions were carried out according to the procedure employed in Example I except that 4-ounce bottles were used for the tests instead of Pyrex tubes. Three times the quantities of reagents used in the preceding example were employed. One bottle was subjected to ultrasonic treatment for 15 one-minute periods in order to obtain a stable emulsion while the other was used as a control. The bottle was cooled between each period of ultrasonic treatment. The total time of treatment and cooling was 30 minutes. At the end of an eight-hour reaction period conversion in the treated bottle had reached 24.5 per cent and at the end of twelve hours a 47.7 per cent conversion was realized. No reaction occurred in the control bottle.

EXAMPLE III

Two runs were made to determine the effect of the length of time of ultrasonic treatment on the monomer conversion. The procedure of Example I was employed using 20 mm. Pyrex tubes. One tube was exposed to ultrasonic waves once for one minute and the other tube was subjected to ultrasonic treatment for 20 one-minute periods. The temperature was maintained at 50° C. for four hours. At the end of this period the conversion was substantially the same in both tubes, 24 per cent in the first tube and 23.5 per cent in the second.

EXAMPLE IV

A series of runs were made to test the effect of soap concentration in connection with our invention. These runs were conducted with the recipe and procedure as in the run of Example I, with no agitation of the mixture after ultrasonic irradiation. The following table shows the results obtained, the reaction time being 4 hours, at 50° C., after irradiation.

*Effect of soap concentration*

| Soap Concentration Parts per 100 parts Monomeric Material | Percent Conversion |
|---|---|
| 5 | 23 |
| 2.8 | 12 |
| 0.7 | 0 |
| 0.3 | No emulsification. |

From these data it is evident that function of the soap during the polymerization is not solely that of an emulsifier. Although ultrasonic irradiation resulted in a stable emulsion when the soap concentration was 0.7 part per 100 parts of monomeric material, or greater, no polymer was produced after 4 hours at 50° C. even though 23% of polymer was produced under the same conditions with 5 parts of soap.

As will be evident to those skilled in the art, various modifications of this invention can be made, or followed, in the light of the foregoing disclosure and discussion, without departing from the spirit or scope of the disclosure or from the scope of the claims.

We claim:

1. In the production of a synthetic rubber by polymerization of a liquid monomeric material comprising a major amount of butadiene and a minor amount of styrene while admixed with an aqueous medium, the improvement which comprises incorporating in a mixture of said monomeric material and aqueous medium to be reacted a catalyst for said polymerization and an amount of a soap sufficient to aid in forming a stable emulsion upon ultrasonic irradiation and in addition sufficient to have polymerization take place subsequent to ultrasonic irradiation, subjecting a resulting liquid mixture of monomeric material and aqueous medium to ultrasonic vibration in the range of 20 to 500 kilocycles per second and of an intensity and for a period sufficient only to transform said mixture into a stable emulsion, and subsequently maintaining a resulting emulsion at a polymerization temperature for a time sufficient to effect conversion to a synthetic rubber latex.

2. The process of claim 1 wherein the ratio of aqueous medium to monomeric material is between 1.5:1 and 2.75:1 and the amount of soap is greater than 0.7 part per 100 parts of monomeric material.

3. In the production of synthetic rubber by copolymerization in aqueous emulsion of a monomeric material comprising a major amount of 1,3-butadiene and a minor amount of styrene, the improvement which comprises admixing an aqueous medium and said monomeric material in a ratio between 1.5:1 and 2.75:1 by weight, together with a soap emulsifying agent in an amount between 2.8 and 5 parts by weight per 100 parts of said monomeric material and a catalyst for said copolymerization, subjecting said admixture to ultrasonic vibration in the range between 20 and 500 kilocycles per second and of an intensity and for a period sufficient only to transform said mixture into a stable emulsion, and subsequently polymerizing a resulting emulsified mixture in the absence of ultrasonic vibration and in the absence of vigorous mechanical agitation.

4. An improved process for polymerizing a monomeric material comprising a major amount of a conjugated diolefin polymerizable when dispersed in an aqueous medium, which comprises admixing such a monomeric material with an aqueous solution of an emulsifying agent and a polymerization catalyst for emulsion polymerization, subjecting a resulting mixture to ultrasonic vibration in the range of 20 to 500 kilocycles per second and of an intensity and for a period sufficient only to transform said mixture into a stable emulsion, and subsequently maintaining a resulting emulsion at a polymerization temperature for a time sufficient to effect polymerization of said monomeric material.

IZAAK M. KOLTHOFF.
CHARLES W. CARR.

REFERENCES CITED

The following references are of record in the file of this patent:

UNITED STATES PATENTS

| Number | Name | Date |
|---|---|---|
| 1,734,975 | Loomis | Nov. 12, 1929 |
| 1,992,938 | Chambers | Mar. 5, 1935 |
| 2,163,649 | Weaver | June 27, 1939 |
| 2,384,277 | Calcott et al. | Sept. 4, 1945 |

FOREIGN PATENTS

| Number | Country | Date |
|---|---|---|
| 339,255 | Great Britain | Dec. 1, 1930 |

OTHER REFERENCES

Maher et al., Rubber Age, volume 59, pages 557–562, August 1946.

Starkweather et al., Ind. Eng. Chem., volume 39, Number 2, pages 210–222, February 1947.